Figure 1:
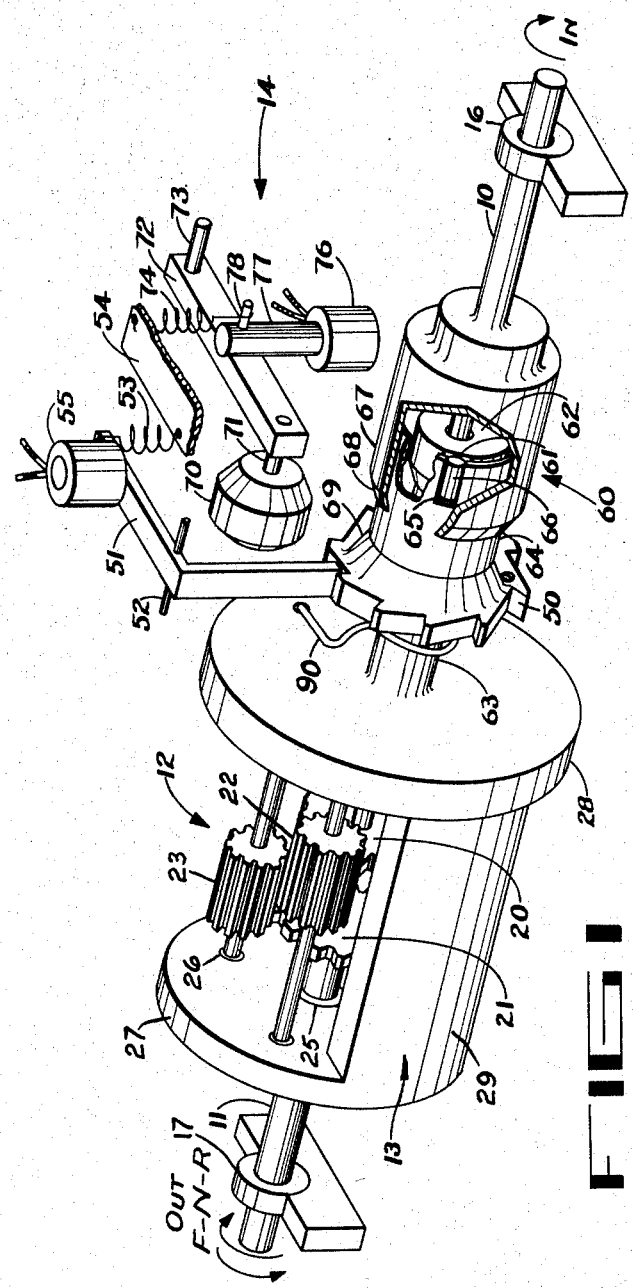

Sept. 22, 1959   G. B. MORRIS   2,905,023
IN-LINE REVERSING MECHANISM
Filed Nov. 13, 1956   2 Sheets-Sheet 1

INVENTOR.
GLEN B. MORRIS
BY
Moody & Hahuhn
ATTORNEYS

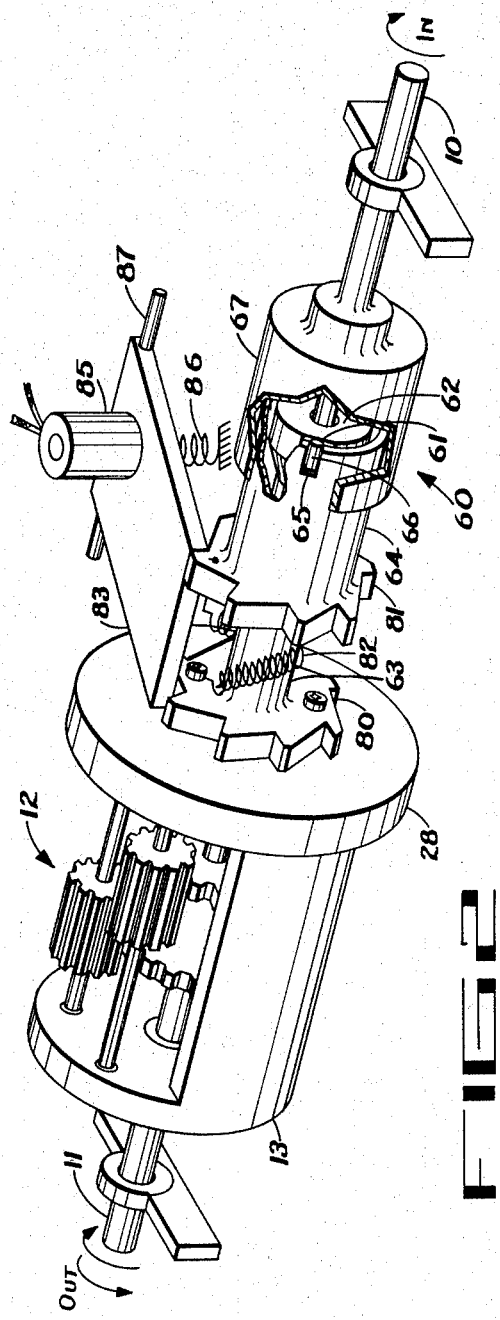

2,905,023

IN-LINE REVERSING MECHANISM

Glen B. Morris, Marion, Iowa, assignor to Collins Radio Company, Cedar Rapids, Iowa, a corporation of Iowa Application November 13, 1956, Serial No. 621,758

3 Claims. (Cl. 74—792)

This invention relates to power transmission equipment and more particularly to reversing mechanisms.

Prior art devices for introducing a reversed motion in a shaft have involved the use of a cluster gear on a counter shaft or some other reversing means involving excess size and weight. Further, the control systems for the prior art systems have been somewhat complicated, requiring shifting of sliding gears or the like. Where sliding gears have been utilized in reversing mechanisms, their synchronism has been an immense problem. Other kinds of drives have limitations as to compactness, etc., especially belting systems.

Accordingly, it is an object of this invention to provide a reversing mechanism capable of compactness and ease of control.

It is an object of this invention to provide a reversing mechanism which is simple, reliable, and capable of electromagnetic solenoid control.

It is a further object of this invention to provide a reversing mechanism in which the input and output shafts are in line, yielding a very compact arrangement.

It is an object of this invention to provide a reversing mechanism capable of extremely high endurance with good reliability over its entire life.

It is a feature of this invention that the output shaft is coaxial and in line with the input shaft.

It is a further feature of this invention that the output shaft rotation can be selectably forward or reverse at the same speed with very little intervening time for shifting the direction of rotation, the reversing time being in the order of magnitude of the operating time of the solenoid used for control.

It is a further feature of this invention that the gears used in the system are constantly in mesh, with tooth pressures on the same side for both rotations, avoiding synchronizing and backlash problems.

Further objects, features, and advantages of the invention will become apparent from the following description and claims when read in conjunction with the drawings in which:

Figure 1 shows a form of the invention having a different control system and yielding forward, neutral, and reverse, and Figure 2 shows a form of the invention having a simplified control system and yielding forward or reverse.

In Figure 1 input shaft 10 is coupled to output shaft 11 by a gear train 12 contained within and mounted on gear carrier 13. The control system 14 is utilized to control the relation of the gear carrier to the input shaft and to the frame. Input shaft 10 is rotatably mounted in a bearing 16 while output shaft 11 is rotatably mounted in bearing 17.

Gear train 12 consists of an input gear 20 and an output gear 21. For equal forward and reverse speeds, these relatively large gears 20 and 21 are equal in the number of teeth thereon. Coupling input and output gears 20, 21 are spur gears 22 and 23. These spur gears are wider toothed so as to engage both their related large gears and each other. Gear 20 meshes with gear 22. Gear 22 meshes with gear 23, and gear 23 couples to gear 21.

A bearing 25 is provided for rotation of output shaft 11 in the gear carrier. A similar bearing (not visible) is provided for input shaft 10. Spur gears 22 and 23 are rotatably mounted and may be mounted fixed to shafts with bearings 26 for the shafts. In Figure 1 the dimension longitudinal to the shafts is shown exaggerated for ease of illustration of the gear train, it being readily seen that the spur gears 22 and 23 need only be slightly more than twice as wide in tooth dimension as the larger diameter input and output gears, with a slight end clearance between the larger gears, thus making a compact revolving gear carrier.

For greater strength, if needed in the power train, additional set or sets of spur gears like 22 and 23 may be added in mesh with the larger gears, equally spaced about the perimeter of the gear carrier. This provides balancing of the meshing thrusts on the input and output gears and eases the strain on the bearings in the gear carrier.

It is readily seen that gear carrier 13 is composed of end plates 27 and 28 connected by a column (or columns) 29 which keeps end plates 27 and 28 spaced parallelly and without twist relative to each other.

The stop means for providing reaction against the gear train for the reverse sequence is provided by a ratchet wheel 50 which is stopped by a pawl 51. Pawl 51 is pivotally mounted on fixed pivot 52 and pulled out of engagement with ratchet 50 by a spring 53 between the free end of pawl 51 and a portion of the frame 54. An electromagnetic solenoid 55 is used to pull pawl 51 into engagement with ratchet 50. A bidirectional overrunning clutch 60 is used in completing the coupling to the ratchet 50, etc.

Clutch 60 is composed of a series of flats 61 on an enlarged end 62 of the extension 63 mounted on end disc 28. Running external to the enlarged end 62 is a cylinder 64 which is fastened to ratchet 50. Cylinder 64 extends over enlarged end 62 and has notches 65 opposite each of the notches. Carried within each notch 65 is a roller 66. Running externally of the rollers is drum 67 which internal dimension is slightly greater than the diameter of the rollers when resting on the center portion of flats 61, but which is smaller than the diameter of the rollers before they ride up to the circumference of the cylindrical portions 62. The flats have symmetry with respect to rotation so that they act the same for either direction of rotation.

Drum 67 is fastened directly to input shaft 10 and has on its end nearest ratchet 50 a beveled portion 68. Facing the beveled end of drum 67, on the side adjacent of ratchet 50, and integral therewith, is a second beveled portion 69. Cooperative with the beveled portions 68 and 69 is a roller 70 which is mounted for free rotation on a pivot 71. Roller 70 may be of rubber, leather or the like to make a friction coupling. Pivot 71 is mounted by arm 72 on a fixed pivot 73 fastened to the frame or chassis 54. Arm 72 is urged upward carrying roller 70 radially away from the beveled portions by a spring 74. A solenoid 76 having a plunger 77 is coupled by a pin joint 78 to arm 72 for urging roller 70 into contact with beveled portions 68 and 69.

A spring 90 is mounted between gear carrier end disc 28 and ratchet 50. This spring urges ratchet 50 rotationally against the stop effect of pawl 51 and with the rotation of the input shaft 10. The selection of the direction rotation of the input shaft is determined by the shape of ratchet 50.

In operation shaft 10 is rotated in a clockwise direction, as dictated by the illustrated shape of ratchet 50, which must be such as to stop rotation of shaft 64 against the rotation of the input shaft.

For forward drive, pawl 51 is pulled out of engagement with ratchet 50, and roller 70 is momentarily forced against beveled portions 68 and 69. As beveled portion 68 is rotated by input shaft 10, roller 70 is rotated and carries with it shaft 64. This causes rollers 68 of the overrunning clutch to advance on the flats 61, to jam the rollers between the flats and the input drum 67. This jamming couples gear carrier 13 through the shaft 63 and the large portion thereof 62, to the drum 67, and locks the system together for forward rotation. That is, through rollers 66 the gear carrier is driven forward at the same speed that the input shaft 10 is driven. This provides the reaction torque for dragging gear 21 in the same forward direction.

For reversing the direction of rotation, solenoid 55 is actuated forcing pawl 51 into ratchet 50. This stops ratchet 50 from rotating further. The slots 65, retaining rollers 66, drag them down the flats 61 into the neutral position, thus breaking the lock between drum 67 and disc 28 by enlarged portion 62. Further rotation of shaft 10 now turns gear 20 and through gear train 12, gear 21 for a reversal of the input shaft motion. The reaction of the gear train drives gear carrier 13 clockwise in the direction of the input rotation until the other ends of flats 61 from the end used while driving forward pinches rollers 66 against drum 67. At this point rollers 66 rotate some because of the rotation of drum 67 and slide on flats 61. The reaction torque of gear carrier 13 is thus stopped by the ratchet 50 holding the rollers circumferentially, and the drum 67 holding the rollers radially.

Release of solenoid 55 permits spring 53 to pull pawl 51 out of engagement with ratchet 50. This permits spring 80 to rotate ratchet 50 clockwise slightly relative to carrier 13 to position rollers 66 back at the neutral point on flats 61 where the rollers do not contact drum 67. At this point there is no reaction provided for the gear train to drive reversely, and there is no coupling through the clutch on the forward side of the flats 61 to couple the system together for forward motion. This is a neutral point, providing no output rotation when so desired.

Actuation of solenoid 55 continuously is essential for the reverse position; only a short-time actuation of solenoid 76 is needed to lock up the overrunning clutch for the forward drive. To achieve neutral from a forward drive it is necessary to momentarily actuate solenoid 55 to free the rollers in the overrunning clutch from the jammed position which they achieve in a forward drive.

In Figure 2, gear train 12 in carrier 13, forming a coupling between input shaft 10 and output shaft 11, is the same as in the prior figure and operates in the same manner. A bidirectional overrunning clutch 60 is used as part of the coupling system between the chassis, the gear carrier, and the input shaft.

The clutch in itself is the same, having flats 61 on an enlarged end 62 which is the extension of a hollow shaft 63 running towards the gear carrier. A second hollow shaft 64 surrounding shaft 63 extends into the clutch system with slots 65 provided therein to accommodate rollers 66. A drum 67 external of the rollers 66 completes the clutch as used in the form of Figure 3 and explained in the operation of Figure 2. Shaft 63 is coupled directly to carrier 13 by means of a ratchet 80 fastened to the end plate 28. A second ratchet 81 is formed on the end of shaft 64. Thus, ratchets 80 and 81 are coaxial in adjacent parallel planes. The position of ratchet 81 relative to ratchet 80 controls the position of rollers 66 on flats 61.

Ratchets 80 and 81 are so adjusted that when a tooth of each is brought into a line parallel to the shaft bearing, the rollers 66 are positioned in the neutral or central portion of the flats 61. A spring 82 is connected between ratchet 80 and ratchet 81 for urging ratchet 81 in the direction against which it is stopped. This is to say, for a clockwise input on shaft 10, ratchets 80 and 81 are stopped against rotation in this clockwise direction by a stop bar 83. The force of spring 82 thus advances ratchet 81 clockwise relative to ratchet 80 in the direction against the stop of 83. When ratchet 81 is advanced by spring 82, the advance is sufficiently great to jam roller 66 between the forward driving end of flats 61 and the drum 67 as in Figure 1.

Further in Figure 2, an electromagnet 85 is arranged to pull stop bar 83 up out of engagement with ratchets 80 and 81. Spring 86 opposes the pull of solenoid 85, and pulls stop bar 83 down into engagement with the ratchets upon de-energization of the solenoid. Stop bar 83 swings about fixed pivot 87.

In operation, a clockwise input rotation of shaft 10 rotates drum 67 and the large input gear in train 12. With the solenoid de-energized, stop bar 83 drops into engagement with ratchets 80 and 81. Ratchet 81 is stopped first, then 80, permitting, whether engaged or not, rollers 66 to assume a neutral position on the flats 61. As ratchet 80 is stopped gear carrier 13 is prevented from rotating for functioning of the reversing gear train 12 in the manner explained earlier.

Upon energization of solenoid 85, stop bar 83 is pulled out of engagement with ratchets 80 and 81, freeing carrier 13 for rotation. As ratchet 81 is released, spring 82 moves it forward in phase relative to the ratchet 80, to jam rollers 66 between drum 67 and flats 61. Once rollers 66 are jammed in the forward driving position, the large end 62, fastened to gear carrier 13, is coupled to shaft 10 as is the input gear of the gear train. This couples the entire unit together for driving in the forward motion as explained earlier.

Thus the system of Figure 2 has only forward or reverse, depending on the position of the stop bar 83. The direction changing time is substantially that of the release and take-up time of the solenoid 85.

For longer life of the overrunning clutch, the flats 61 may be made convex slightly, whereby the rollers 66 are pinched more gradually between the clutch surface at flats 61 and the drum 67. The endurance of the mechanism as shown, however, is very great, operating over a million cycles without incident.

Although this invention has been described with respect to particular embodiments thereof, it is not to be so limited because changes and modifications may be made therein which are within the full intended scope of the invention as defined by the appended claims.

I claim:

1. An in-line reversing gear train comprising an input shaft, an output shaft, said shafts being rotatably mounted, a gear carrier, said gear carrier having end plates rotatably mounted on said shafts, gears mounted axially on said shafts between said end plates, a plurality of spur gears rotatably mounted between said end plates, said plurality of spur gears meshing with said shaft-mounted gears and each other in a reversing gear train, an overrunning clutch, said clutch having a drum driving member, a flatted driven member, a plurality of rolling members, a positioning means, said positioning means locating said rolling members over the flats of said driven member, said driven member being fixed to one of said end plates, said driving member being fixed to said input shaft, a ratchet, said ratchet being fixed to said control member, spring means, said spring means being attached between said one end plate and said ratchet, and stop means engageable with said ratchet for determining the direction of rotation of said output shaft.

2. An in-line reversing gear train comprising an input shaft, an output shaft, said shafts being rotatably mounted, a gear carrier, said gear carrier having end plates rotatably mounted on said shafts, gears mounted on said shafts between said end plates, a plurality of spur gears rotatably mounted between said end plates, said plurality of spur gears meshing with said shaft-mounted gears and each other in a reversing gear train, an overrunning clutch, said clutch having a drum driving member, a flatted driven member, a plurality of rolling members, a roller positioning means, said roller positioning means locating said rolling members above the flats of said driven member, said driven member being fixed to one of said end plates, said driving member being fixed to said input shaft, a first ratchet, said first ratchet being fixed to said roller positioning means, a second ratchet, said second ratchet being fixed to said one end plate, spring means, said spring means being attached between said ratchets, and stop means consecutively engageable with said first and second ratchets whereby, when said first ratchet is engaged by said stop means said overrunning clutch is disengaged and when said second ratchet subsequently becomes engaged by said stop means, said gear carrier is stopped from rotating relative to said frame causing said output to reverse.

3. An in-line reversing gear train comprising an input shaft, an output shaft, said shafts being rotatably mounted, a gear carrier, said gear carrier having end plates rotatably mounted on said shafts, gears mounted on said shafts between said end plates, a plurality of spur gears rotatably mounted between said end plates, said plurality of spur gears meshing with said shaft-mounted gears and each other in a reversing gear train, an overrunning clutch, said clutch having a drum driving member, a flatted driven member, a plurality of rolling members, a positioning means, said positioning means locating said rolling members over the flats of said driven member, said driven member being fixed to one of said end plates, said driving member being fixed to said input shaft, a ratchet, said ratchet being fixed to said positioning means, spring means, said spring means being attached between one end plate and said ratchet, stop means engageable with said ratchet for determining the direction of rotation of said output shaft, and friction roller means, said roller means contacting both said control and said driving members for positively engaging said clutch.

References Cited in the file of this patent

UNITED STATES PATENTS

| | | |
|---|---|---|
| 2,196,585 | Gette | Apr. 9, 1940 |
| 2,414,832 | Orr | Jan. 28, 1947 |

FOREIGN PATENTS

| | | |
|---|---|---|
| 512,686 | Germany | Nov. 15, 1930 |
| 599,431 | Great Britain | Mar. 12, 1948 |